April 19, 1955    J. HOULDSWORTH    2,706,467
HYDRAULIC DRIVE AND CONTROL MECHANISM FOR MACHINE TOOLS
Filed Dec. 3, 1949    2 Sheets-Sheet 1
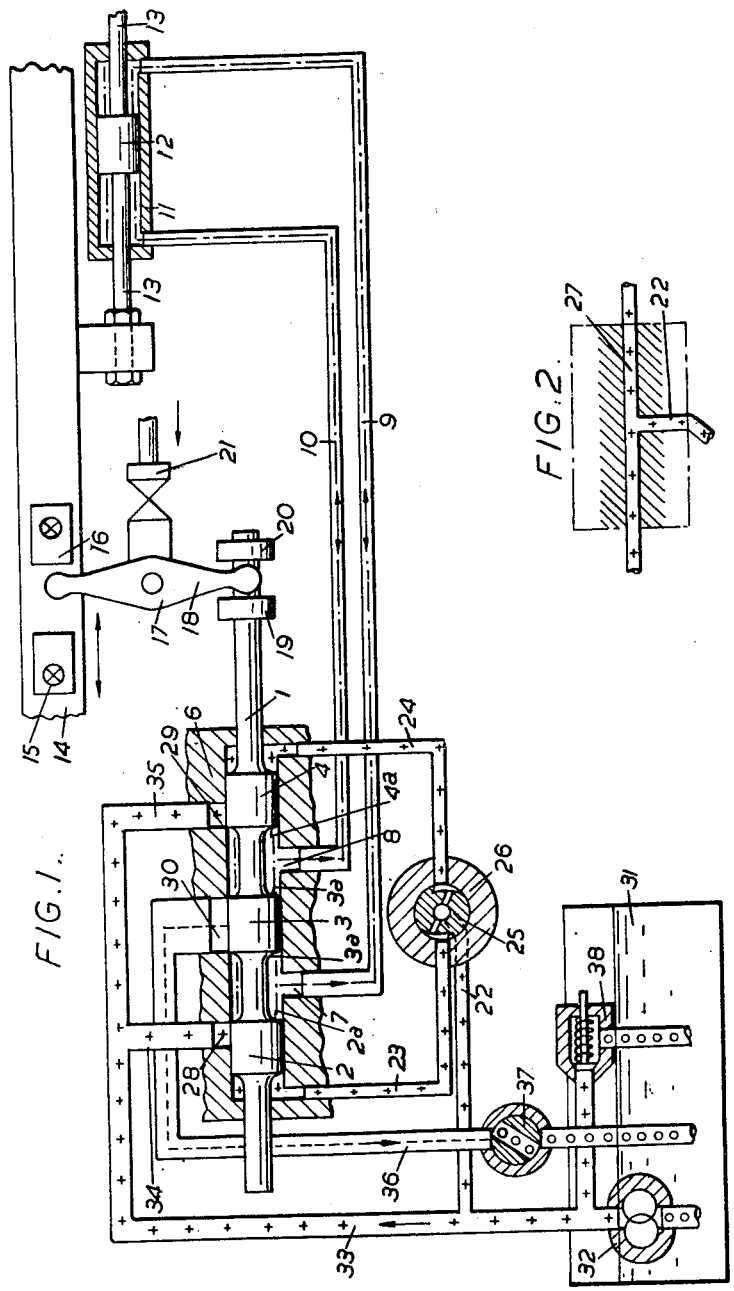
Inventor
Joseph Houldsworth

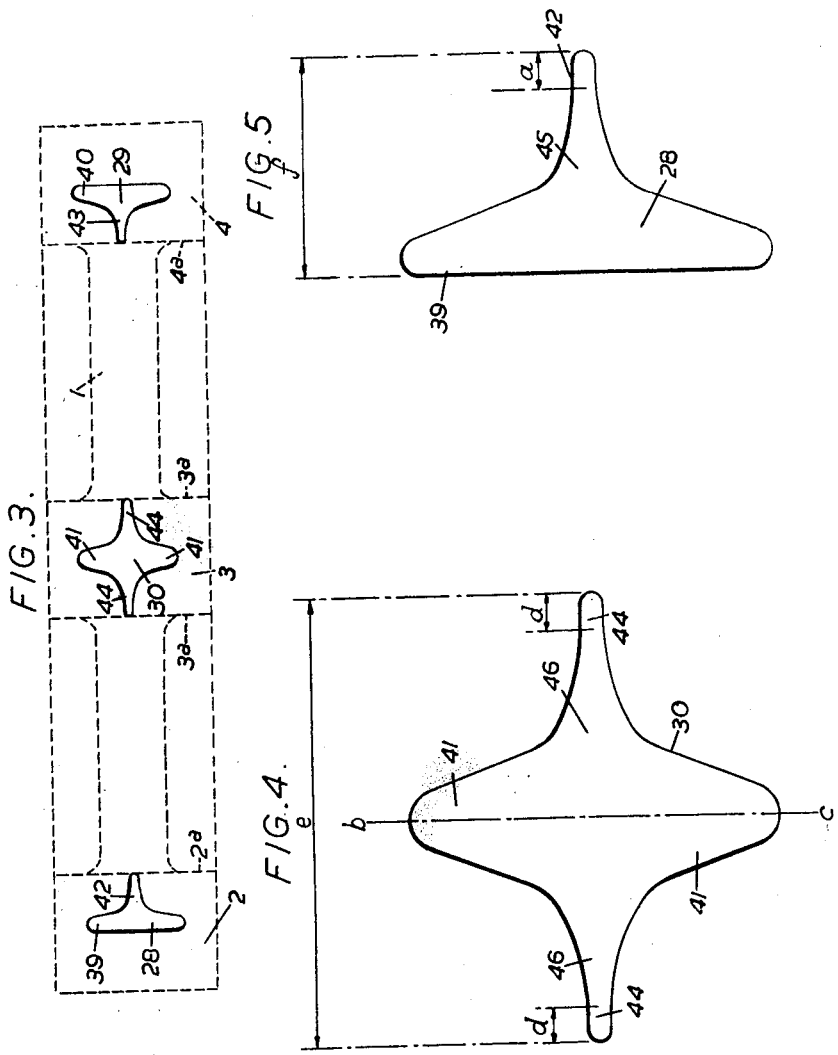

United States Patent Office 2,706,467
Patented Apr. 19, 1955

2,706,467

HYDRAULIC DRIVE AND CONTROL MECHANISM FOR MACHINE TOOLS

Joseph Houldsworth, Leicester, England, assignor of one-half to A. A. Jones & Shipman Limited, Leicester, England, a British company Application December 3, 1949, Serial No. 130,976

Claims priority, application Great Britain January 4, 1949

5 Claims. (Cl. 121—46.5)

This invention relates to machine tools such, for example, as cylindrical or surface grinding machines, and has reference particularly to such machines of the kind equipped with a hydraulically operated reciprocatory part adapted to be reversed at the termination of each longitudinal traverse under the control of hydraulic reverse valve means.

The invention is applicable, for instance, to machine tools wherein there is movement of the work table or carriage and the operating tool, for example grinding wheel, one or each in relation to the other.

In a machine tool of the kind concerned, a cylinder and piston arrangement in connection with the reciprocable part is provided on the machine, and fluid pressure in the cylinder, controlled by the reverse valve means, is used to effect reciprocation of the said part.

The various valves for controlling the fluid in the hydraulic system of such a machine are located in a valve block a section of which is bored to provide therein either a cylinder or a cylindrical chamber within which is mounted a valve either of the piston or rotary type comprising connected portions for use in opening and closing ports for controlling the flow of fluid into and from the two opposite ends of the driving cylinder. The valve block is, naturally, also formed with inlet and exhaust ports so disposed as to be opened and closed by the connected valve portions, all as well known to those acquainted with the art concerned.

The object of the present invention is to improve the hydraulic reversing means in a hydraulically-operated machine tool of the kind herein referred to in such a way as to produce substantially shockless and accurate reversal of movement of the reciprocatory part, and also enable the said part to make short strokes.

According to the characteristic feature of this invention, each of the inlet and exhaust ports is made with a wide portion which tapers off into a relatively narrow portion.

The ends of the ports must, of course, be accurately located with respect to the appropriate faces or edges of the connected valve portions, and the idea is that whenever a port is opened portions thereof of gradually increasing width will be progressively uncovered, and vice versa. The extremities of the relatively narrow portions constituting the tails of the ports are, however, preferably parallel sided so that whenever the reversing valve is moved to open appropriate ports, there is a time lag before the portions of the said ports of gradually increasing width commence to be uncovered. This time lag is, of course, determined by the length of the parallel-sided extremities of the ports.

A specific example of the improved hydraulic reversing means incorporated in the hydraulic system of a machine of the kind herein referred to will now be described with reference to the accompanying diagrammatic drawings.

In the drawings:

Figure 1 is a part-sectional diagram showing the complete hydraulic system and a fragmentary portion of the reciprocatory table of the machine.

Figure 2 is a detail sectional view showing an alternative form of choke which may be incorporated in the said system.

Figure 3 is a developed layout of the inlet and exhaust ports shown in relation to the reversing valve, and Figures 4 and 5 are enlarged detail views of the central and one of the end ports in the cylinder respectively.

Like parts are designated by similar reference characters throughout the drawings.

Referring to Figure 1 it will be seen that the hydraulic system includes a single reversing valve 1 which is of the piston type and comprises three connected pistons 2, 3 and 4 mounted in a cylinder 5 formed in a valve block 6. 7 and 8 indicate ports of connections leading, via pipes 9 and 10, to the respectively opposite ends of a fixed cylinder 11 in which is fitted a double-ended piston 12 connected, by means of rods 13, with the reciprocatory table 14 of the machine. The table 14 is furnished with spaced trip dogs 15 and 16 arranged for action upon a centrally fulcrummed lever 17 provided for actuating the reversing valve 1. The arm 18 of the lever 17 acts between spaced collars 19 and 20 on the rod of the valve, these collars being axially adjustable to vary the spacing between them. At 21 there is provided a spring-loaded V point adapted to produce a load-and-fire effect. The ends of the valve 1 are equipped with fluid dash-pots (not shown) which are maintained filled by fluid under pressure flowing from a feed pipe 22 through passageways 23 and 24. 25 is an adjustable rotary choke designed to produce variable dash-pot damping. The choke 25 is housed either in the valve block 6 or, as shown, in a separate housing 26. When the required choking valves are known or have been established, however, the variable choke 21 may be replaced by a fixed choke consisting of a passage or passages of fixed dimensions sufficient to provide the required resistance. One such alternative form of choke is indicated in purely diagrammatic fashion at 27 in Figure 2. In the valve block 6 are formed three ports 28, 29 and 30. These are the inlet and exhaust ports which are opened and closed by the reversing valve 1. In the specific arrangement illustrated the ports 28 and 29 are the inlet ports whilst the central double port 30 is the exhaust port. This arrangement may, however, be reversed so that the ports 28 and 29 are the exhaust ports and the port 30 is the inlet port. Oil from a tank or reservoir 31 is pumped into the system by means of a pump 32 via a pipe 33 having branches 34 and 35 communicating with the inlet ports 28 and 29 respectively (Figure 1). Oil is returned to the said tank or reservoir through a pipe 36 the inner end of which latter is in communication with the exhaust port 30. A speed control choke 37 is incorporated in the pipe 36 at any convenient location between the exhaust port 30 and the tank or reservoir 31. At 38 is indicated a spring-influenced relief valve which is arranged in communication with the pipe 33 and adapted to be opened to by-pass oil back to the tank or reservoir 31 in the event of the input pressure becoming excessive. In Figure 1, oil at input pressure is indicated by crosses; oil at output pressure, dependent upon the setting of the speed control choke 37, is indicated by short dashes; oil at atmospheric pressure is indicated by circles; and oil at pressure alternating between the input and output pressures, dependent upon the direction of traverse of the table 14, is indicated by dot-and-dash lines.

The general arrangement of the hydraulic system so far described is already known and no claim thereto per se is made. In accordance with the characteristic feature of the present invention, the ports 28, 29 and 30 have wide areas 39, 40 and 41 tapering off to narrow parallel-sided extremities 42, 43 and 44 respectively. The precise shaping of the ports is shown more clearly in Figures 4 and 5. Thus, the left-hand inlet port 28 shown by way of example in Figure 5 is mainly triangular in shape and has an extended apex or tail portion 45 the parallel-sided extremity 42 of which is of the longitudinal extent marked $a$. The outer edge of the port 28, corresponding with the base of the triangle, is straight, whilst the remaining, i. e. opposed, sides of the said port are inwardly curved to a comparatively sharp extent. The right-hand inlet port 29 is of the same shape and dimensions as the port 28 but is opposite hand as to disposition. With regard to the double exhaust port 30 clearly depicted in Figure 4, the two halves thereof at opposite sides of the median line $b$—$c$ are identical in shape and size but right and left-hand respectively. Here again, each half of the exhaust port (which is, in effect, a single exhaust port in itself) is mainly triangular in shape and has an extended apex or tail portion 46 the extent of the parallel-sided extremity 44 of which is indicated at $d$. The opposing sides of the two halves are also inwardly curved. It will be noted that the length $e$ of the double exhaust port 30 is twice that of the length $f$ of each of the two inlet ports 28 and 29.

The three ports 28, 29 and 30 are accurately spaced endwise so that with the valve 1 in the neutral position shown in Figures 1 and 2, the narrow extremities 42, 43 and 44 are coincident or substantially so with the faces or edges 2a, 4a and 3a of the connected pistons.

Whenever the reversing valve 1 (as viewed in Figure 1) is moved to the left, the inlet port 28 and the right-hand end of the double exhaust port 30 are simultaneously opened, the inlet port 29 remaining closed. As a consequence, oil in the left-hand end of the cylinder 11 and in the pipe 10 flows back to the tank or reservoir 31 through the opened half of the exhaust port and via the pipe 36 and the speed control choke 37, whilst oil under pressure is forced along the pipe 9 into the right-hand end of the cylinder 11; the table 14 accordingly moves to the left. When, on the other hand, the valve 1 is moved to the right of the neutral position indicated in Figure 1, the inlet port 29 and the left-hand end of the double exhaust port 30 are opened, the inlet port 28 remaining closed. Consequently, oil in the right-hand end of the cylinder 11 and in the pipe 9 flows back to the supply through the opened left-hand end of the exhaust port, the pipe 36 and the choke 37, and oil under pressure is forced along the pipe 10 into the left-hand end of the cylinder 11, moving the table 14 to the right. And, as already explained, whenever a port is opened there is a time lag before the gradually widened main portion of the port commences to be uncovered, the lag being determined by the length of the parallel-sided extremity of the port.

With the described shaping and arrangement of the inlet and exhaust ports it is possible to maintain accurate reversal at one set speed to less than plus/minus .0005″ of any pre-set position. It is also possible to maintain accurate reversal even during speed changes to plus/minus .002″ of any given point, without reversing shock.

The arrangement also makes it possible to reverse a reciprocatory table completely and continuously with lengths of table traverse of as little as .020″ or less.

What I claim then is:

1. In a machine tool, reciprocating drive mechanism comprising a hydraulic motor connected to the reciprocating part for driving the same, reversing valve means including a casing formed with pressure supply means, exhaust port means, means connecting the pressure supply means to a pressure fluid supply, and formed with delivery port means connected to chambers of the hydraulic motor on opposed sides of the piston of the latter, and including a valve member with a plurality of piston heads movable in said casing to close said pressure supply means and exhaust port means simultaneously and to uncover one or other of these means, dependent on its direction of movement, to force fluid through one or other of the delivery port means to said motor, a mechanical transmission for moving said valve member in its casing, and abutment means associated with said reciprocating part for direct mechanical operation of said mechanical transmission at the ends of the reciprocating stroke of said part, said pressure supply means and exhaust port means each being of generally and oppositely tapered form and each comprising, in the direction of taper thereof, a portion of sharp taper, followed by a portion of lesser taper, and terminating in a substantially parallel-sided tail.

2. A reciprocating drive mechanism according to claim 1, in which there are four pressure supply means and exhaust port means, two of which are combined together to form a single port situated centrally between the other two and having their tail portions directed outwardly away from one another, and in which each of the delivery port means is located between one of the outer control port and the central combined control port, said valve member having three piston heads.

3. A reciprocating drive mechanism according to claim 1 in which each end of the casing of the reversing valve is enlarged to form a dashpot and means operatively connected to such dashpots to maintain fluid therein.

4. A reciprocating drive mechanism according to claim 1, in which the side walls of the control valve portions of different taper are of substantially equal length.

5. A reciprocating drive mechanism according to claim 1, in which the side walls of said portion of lesser taper of each control valve are inwardly curved.

References Cited in the file of this patent

UNITED STATES PATENTS

| | | |
|---|---|---|
| 813,209 | Holmes | Feb. 20, 1906 |
| 1,690,069 | Ferris | Oct. 30, 1928 |
| 1,817,180 | Drake | Aug. 4, 1931 |
| 1,935,119 | Guild | Nov. 14, 1933 |
| 1,943,061 | Douglas | Jan. 9, 1934 |
| 2,000,805 | West | May 7, 1935 |
| 2,209,418 | Overbeke | July 30, 1940 |
| 2,403,519 | Gardiner | July 9, 1946 |

FOREIGN PATENTS

| | | |
|---|---|---|
| 342,463 | Germany | Oct. 18, 1921 |
| 234,124 | Great Britain | Mar. 4, 1926 |